United States Patent
Tufano et al.

(10) Patent No.: US 10,435,524 B2
(45) Date of Patent: Oct. 8, 2019

(54) PROCESS FOR THE MANUFACTURE OF LONG GLASS FIBRE REINFORCED POLYPROPYLENE COMPOSITIONS

(71) Applicant: SABIC Global Technologies B.V., Bergen op Zoom (NL)

(72) Inventors: Carmela Tufano, Maastricht (NL); Christelle Marie Hélène Grein, Heel (NL)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 338 days.

(21) Appl. No.: 15/531,038

(22) PCT Filed: Nov. 24, 2015

(86) PCT No.: PCT/EP2015/077406
§ 371 (c)(1),
(2) Date: May 26, 2017

(87) PCT Pub. No.: WO2016/083327
PCT Pub. Date: Jun. 2, 2016

(65) Prior Publication Data
US 2017/0321021 A1   Nov. 9, 2017

(30) Foreign Application Priority Data

Nov. 27, 2014  (EP) .................................. 14195135

(51) Int. Cl.
| | | |
|---|---|---|
| *C08J 5/08* | (2006.01) | |
| *B29B 9/14* | (2006.01) | |
| *B29B 15/12* | (2006.01) | |
| *B29B 9/06* | (2006.01) | |
| *B29C 48/154* | (2019.01) | |
| *B29K 23/00* | (2006.01) | |
| *B29K 105/16* | (2006.01) | |
| *B29K 509/08* | (2006.01) | |
| *B29C 48/30* | (2019.01) | |
| *B29C 48/05* | (2019.01) | |
| *B29C 48/04* | (2019.01) | |
| *B29C 48/00* | (2019.01) | |
| *B29C 48/285* | (2019.01) | |
| *B29C 48/34* | (2019.01) | |

(52) U.S. Cl.
CPC ................... *C08J 5/08* (2013.01); *B29B 9/06* (2013.01); *B29B 9/14* (2013.01); *B29B 15/122* (2013.01); *B29C 48/154* (2019.02); *B29C 48/0022* (2019.02); *B29C 48/04* (2019.02); *B29C 48/05* (2019.02); *B29C 48/2886* (2019.02); *B29C 48/30* (2019.02); *B29C 48/34* (2019.02); *B29K 2023/12* (2013.01); *B29K 2105/16* (2013.01); *B29K 2509/08* (2013.01); *C08J 2323/12* (2013.01)

(58) Field of Classification Search
CPC ..... B29C 70/34; B29C 37/0028; B29C 45/14; B29C 41/08; B29C 2043/345; B29C 2045/14557; B29C 45/14631; B29C 45/14786; B29C 66/72141; B29C 70/305; B29C 48/05; B29C 48/154; B29C 48/2886; C08J 5/18; C08J 2323/12; C08J 5/08; B29B 15/14; B29B 9/06; B29B 9/14; B29B 15/122; B29K 2023/12
See application file for complete search history.

(56) References Cited

U.S. PATENT DOCUMENTS

| 4,581,392 A | 4/1986 | Armstrong et al. |
|---|---|---|
| 2010/0140829 A1 | 6/2010 | Bernd et al. |

FOREIGN PATENT DOCUMENTS

| EP | 1364760 A1 | 11/2003 |
|---|---|---|
| NL | 1010646 C2 | 11/1999 |
| WO | 9900543 A1 | 1/1999 |
| WO | 2009080281 A1 | 7/2009 |
| WO | 2014118144 A1 | 8/2014 |

OTHER PUBLICATIONS

International Search Report for International Application No. PCT/EP2015/077406; dated Feb. 1, 2016; 4 pages.
Netherlands Patent No. 1010646; Date of Publication: Nov. 22, 1999; Abstract Only, 1 page.
Written Opinion of the International Search Report for International Application No. PCT/EP2015/077406; dated Feb. 1, 2016; 5 pages.

*Primary Examiner* — Stella K Yi
(74) *Attorney, Agent, or Firm* — Cantor Colburn LLP

(57) ABSTRACT

The present invention relates to a process for the manufacture of a long glass fiber reinforced polypropylene composition at a line speed of at least 6.7 m/s comprising the steps of a) providing at least one continuous glass multifiber strand, b) applying from 0.5 to 20 wt. % based on the weight of the composition of an impregnating agent to said at least one continuous multifiber strand, c) applying a sheath of a polypropylene composition around the strand obtained in step b) so as to form a sheathed continuous multifiber strand, wherein the impregnating agent contains at least 90 wt. % of microcrystalline wax based on the weight of the impregnating agent.

17 Claims, No Drawings

PROCESS FOR THE MANUFACTURE OF LONG GLASS FIBRE REINFORCED POLYPROPYLENE COMPOSITIONS

CROSS REFERENCE TO RELATED APPLICATIONS

This application is a 371 of International Application No. PCT/EP2015/077406, filed Nov. 24, 2015 which claims priority to European Application No. 14195135.0, filed Nov. 27, 2014 both which are incorporated herein by reference in their entirety.

The present invention relates to a process for the manufacture of a long glass fibre reinforced polypropylene composition comprising the steps of a) providing at least one continuous glass multifibre strand, b) applying from 0.5 to 20 wt. % based on the weight of the composition of an impregnating agent to said at least one continuous multifibre strand and c) applying a sheath of a polypropylene composition around the strand obtained in step b) so as to form a sheathed continuous multifibre strand.

Long glass fibre reinforced polypropylene materials are known per se and for example commercially available from SABIC Innovative Plastics under the brand name Stamax. These long glass fibre reinforced polypropylene materials are available as pellets comprising a core and a polypropylene sheath surrounding said core, wherein the core comprises glass fibres extending in a longitudinal direction of the pellet and an impregnating agent.

Methods for the manufacture of such materials are also known in the prior art.

For example, WO 2009/080281 discloses a method for the manufacture of said type of long glass fibre reinforced polypropylene materials. That method comprises the subsequent steps of:
a) unwinding from a package of at least one continuous glass multifilament strand containing at most 2% by mass of a sizing composition;
b) applying from 0.5 to 20% by mass of an impregnating agent to said at least one continuous glass multifilament strand to form an impregnated continuous multifilament strand;
c) applying a sheath of thermoplastic polymer around the impregnated continuous multifilament strand to form a sheathed continuous multifilament strand;
characterised in that the impregnating agent is non-volatile, has a melting point of at least 20° C. below the melting point of the thermoplastic matrix, has a viscosity of from 2.5 to 100 cS at application temperature, and is compatible with the thermoplastic polymer to be reinforced.

According to WO 2009/080281, the sheathed continuous glass multifilament strand may be cut into pellets having a length of from 2 to 50 mm, preferably from 5 to 30 mm, more preferably from 6 to 20 mm and most preferably from 10 to 15 mm.

The term "multifilament strand" as used in WO2009/080821 and the term "multifibre strand" as used herein should be regarded as synonyms and referring to the same type of material, which are often also referred to as roving or glass roving.

Another process to manufacture long glass fibre reinforced polypropylene materials is based on what is known as a pultrusion process. In such a process continuous glass multifibre strands are pulled through a molten resin in such a manner that the individual filaments are fully dispersed into said resin. Examples of such processes are disclosed in EP1364760, NL1010646 and WO 2008/089963.

An important difference between the pultrusion grade long glass fibre reinforced polypropylene materials and the long glass fibre reinforced polypropylene materials as manufactured according to the present invention is that the glass fibres in the present invention are not dispersed in the polyolefin. This dispersion will only take place once the materials are moulded into finished or semi-finished parts in downstream conversion processes, such as for example injection moulding.

To allow a proper dispersion of the glass fibres in such downstream conversion processes the core of the pellets not only contains the glass fibres but also what is referred to as an impregnating agent. The impregnating agent facilitates a proper dispersion of the glass fibres during the moulding of the (semi) finished article. The impregnating agent is an important component of these long glass fibre reinforced polypropylene materials.

First of all, if the dispersion of the glass fibres in the downstream process is insufficient this will result in agglomerates of glass fibres in the end product, resulting in a poor visible appearance, so called "white spots", and possibly even loss or reduction of mechanical properties.

Secondly, if the impregnating agent does not sufficiently couple the glass fibres to each other and to the polypropylene sheath then, upon subjecting the pellets to repetitive mechanical loads, glass fibres may separate from the pellets. Such repetitive mechanical loads may occur for example during transport of the pellets through a piping system, or a vibrating conveyor means, such as a vibrating conveyor belt. Further repetitive mechanical loads occur when a number of pellets are shaken, stirred or when the pellets are filled into a suitable transport container, such as for example an octabin. In addition to that the transport container may be subject to vibrations during transport which may be another cause of glass filaments separating from the pellet. It should be understood that several variations of the above examples may also be considered as repetitive mechanical loads. The repetitive mechanical loads are usually random in nature. Of particular importance is the separation of glass fibres from the pellets during transport of the pellets through a piping system because the separated filaments may cause blocking of the piping system and/or of filters, valves, outlets and the like that are used in the piping system. Such blocking may result in down time of the equipment and possible loss of production capacity. The problem of glass fibres separating from the pellet is often referred to as the "free glass" problem.

So in effect the impregnating agent has at least two key functions, the first one being to effectively couple the glass fibres to each other and to the polypropylene sheath in the pellet and the second one being to provide a sufficient dispersion of the glass fibres in downstream conversion processes.

Examples of suitable impregnating agents are disclosed in WO 2009/080281. WO 2009/080281 specifically discloses that the impregnating agent may be a blend of 30 mass % of a hyper-branched polymer (Vybar 260, available from Baker Hughes) and 70 mass % of paraffin (Paralux oil, available from Chevron). A disadvantage of the impregnating agent of WO 2009/080281 is that it requires off-site blending of the individual components, adding a further step in the logistic chain of the process and consequently making such impregnating agent even more expensive. In general it would be preferred to use a single component impregnating agent so as to overcome mixing issues, like de-mixing of the components, storage issues and more complex logistics.

WO 99/00543 discloses a nonaqueous sizing composition for application to glass reinforcing fibers comprising (a) one or more film formers that are miscible with the polymer to be reinforced; and (b) one or more coupling agents. The film formers may be selected from the group consisting of amorphous waxes, microcrystalline waxes, maleated low molecular weight polypropylenes, hydrocarbon resins. The sizing composition of this document is a material that is applied directly on the glass fibers during their manufacture process. Hence, the sizing composition disclosed in WO 99/00543 is not to be considered as an impregnating agent as defined herein. Rather the impregnating agent is a separate component of the glass fibre reinforced polypropylene composition as manufactured in accordance with the present invention and during the manufacture of said composition said impregnating agent is applied on the glass multifibre strand (roving) comprised of glass fibers that contain a sizing.

In view of the important functions of the impregnating agent there is a continuous need for further impregnating agents that fulfill at least the above mentioned functions, yet which at the same time allow the manufacture of glass fibre reinforced polyolefin materials in a cost-effective manner. In that respect the present inventors have found an impregnating agent that allows the manufacture of glass fibre reinforced polypropylene compositions at very high speed, i.e. with a very high output, without significant effect on either white spots or free glass.

To that extent the present invention is directed at a process for the manufacture of a long glass fibre reinforced polypropylene composition at a line speed of at least 6.7 m/s comprising the steps of
  a) providing at least one continuous glass multifibre strand,
  b) applying from 0.5 to 20 wt. % based on the weight of the composition of an impregnating agent to said at least one continuous multifibre strand,
  c) applying a sheath of a polypropylene composition around the strand obtained in step b) so as to form a sheathed continuous multifibre strand,
wherein the impregnating agent contains at least 90 wt. % of microcrystalline wax based on the weight of the impregnating agent.

The present inventors have surprisingly found that very high production speeds, i.e. line speeds of at least 6.7 m/s, can be achieved by using an impregnating agent which predominantly contains a microcrystalline wax. Preferably the line speed is from 6.7-10 m/s.

In that respect it is to be understood that the microcrystalline wax may be a single microcrystalline wax or a blend of several microcrystalline waxes. It should further be understood that the impregnating agent is a separate component in the composition and should not be confused with the sizing composition (sizing) that is normally applied on the surface of the glass fibers during the manufacture thereof. In that respect the term "glass fibers" should be understood as meaning glass fibers having a glass core and a sizing composition in contact with said glass core. The use of sizing in the manufacture of glass fibers is well known, for example from WO 99/00543, and is even essential for the manufacture of rovings, also referred to as glass multifibre strands. Or, without the presence of a sizing it is impossible to manufacture glass fibers than can be combined into a roving and wound on a bobbin.

So, more specifically the present invention concerns a method for the manufacture of a long glass fibre reinforced polypropylene composition comprising a core and a polypropylene sheath surrounding said core, wherein the core comprises glass fibres and an impregnating agent, wherein the impregnating agent contains at least 90 wt. % of microcrystalline wax based on the weight of the impregnating agent and wherein the glass fibers comprise a glass core and a sizing composition in contact with said glass core.

Microcrystalline waxes are well known materials. In general a microcrystalline wax is a refined mixture of solid saturated aliphatic hydrocarbons, and produced by de-oiling certain fractions from the petroleum refining process. Microcrystalline waxes differ from refined paraffin wax in that the molecular structure is more branched and the hydrocarbon chains are longer (higher molecular weight). As a result the crystal structure of microcrystalline wax is much finer than paraffin wax, which directly impacts many of the mechanical properties of such materials. Microcrystalline waxes are tougher, more flexible and generally higher in melting point compared to paraffin wax. The fine crystalline structure also enables microcrystalline wax to bind solvents or oil and thus prevents the sweating out of compositions. Microcrystalline wax may be used to modify the crystalline properties of paraffin wax.

Microcrystalline waxes are also very different from so called iso-polymers. First of all, microcrystalline waxes are petroleum based whereas iso-polymers are poly-alpha-olefins. Secondly iso-polymers have a very high degree of branching of above 95%, whereas the amount of branching for microcrystalline waxes generally lies in the range of from 40-80 wt. %. Finally, the melting point of iso-polymers generally is relatively low compared to the melting temperature of microcrystalline waxes. All in all, microcrystalline waxes form a distinct class of materials not to be confused either by paraffin or by iso-polymers.

The remaining at most 10 wt. % of impregnating agent may contain a natural or synthetic wax or an iso-polymer. Typical natural waxes are animal waxes such as bees wax, lanolin and tallow, vegetable waxes such as carnauba, candelilla, soy, mineral waxes such as paraffin, ceresin and montan. Typical synthetic waxes include ethylenic polymers such as polyethylene wax or polyol ether-ester waxes, chlorinated naphthalenes and Fisher Tropsch derived waxes. A typical example of an iso-polymer, or hyper-branched polymer, is Vybar 260 mentioned above. In an embodiment the remaining part of the impregnating agent contains or consists of one or more of a highly branched poly-alpha-olefin, such as a polyethylene wax, paraffin.

Since the impregnating agent is a separate component in the glass fibre reinforced polyolefin composition the impregnating agent typically does not contain (a) coupling agent(s), such as for example silanes, more in particular amine functional silanes, even more in particular organofunctional silanes, 3-glycidoxypropylltrimethoxy silane, 3-methacryloxypropyltrimethoxy silane, or 3-aminopropyltriethoxy silane. Such silanes being disclosed in WO 99/00543.

In a preferred embodiment the impregnating agent comprises at least 95 wt. %, more preferably at least 99 wt. % of microcrystalline wax. In view of cost and logistics it is even more preferred that the impregnating agent essentially consists of microcrystalline wax. That is to say, the impregnating agent is most preferably a single component material as compared to a mixture of components.

Said in another way, it is most preferred that the impregnating agent substantially consists of microcrystalline wax. In an embodiment the impregnating agent does not contain paraffin. The term substantially consists of is to be interpreted such that the impregnating agent consists of the microcrystalline wax and further may contain minor amounts of additives for stabilisation purposes, such as anti-oxidants or UV stabilisers.

The term substantially consists however does not mean that further wax or wax-like materials are present.

In a preferred embodiment wherein the microcrystalline wax has one or more of the following properties,
  a drop melting point of from 60 to 90° C. as determined in accordance with ASTM D127
  a congealing point of from 55 to 90° C. as determined in accordance with ASTMD938
  a needle pen penetration at 25° C. of from 7 to 40 tenths of a mm as determined in accordance with ASTM D1321
  a viscosity at 100° C. of from 10 to 25 mPa·s as determined in accordance with ASTM D445
  an oil content of from 0 to 5 wt. % based on the weight of the microcrystalline wax as determined in accordance with ASTM D721

More preferably the microcrystalline wax has the above mentioned properties in combination, that is to say the microcrystalline wax has the following properties
  a drop melting point of from 60 to 90° C. as determined in accordance with ASTM D127, and
  a congealing point of from 55 to 90° C. as determined in accordance with ASTMD938, and
  a needle pen penetration at 25° C. of from 7 to 40 tenths of a mm as determined in accordance with ASTM D1321, and
  a viscosity at 100° C. of from 10 to 25 mPa·s as determined in accordance with ASTM D445, and
  an oil content of from 0 to 5 wt. % based on the weight of the microcrystalline wax as determined in accordance with ASTM D721.

The amount of impregnating agent may vary and is typically in the range of from 0.5 to 20 wt. %, preferably from 0.8 to 7 wt. % based on the total weight of the composition.

The amount of impregnating agent may also be expressed relative to the weight of the glass fibres. In an embodiment the amount of impregnating agent is from 5 to 15 wt. %, more preferably from 7 to 15 wt. % based on the weight of glass fibres.

Preferably the impregnating agent fulfills the requirements as set out in WO2009/080281, i.e. that the impregnating agent is compatible with the polypropylene of the polypropylene sheath, is non-volatile, has a melting point of at least 20° C. below the melting point of the polyolefin of the polyolefin sheath and has a viscosity of from 2.5 to 100 cS at application temperature. The requirement of compatibility is met given that the impregnating agent comprises at least 90 wt. % of microcrystalline wax.

Polypropylene Composition

The polypropylene composition of the (polypropylene) may be based on a propylene homopolymer, a propylene-alpha olefin random copolymer, such as a propylene-ethylene random copolymer, impact propylene copolymers, sometimes referred to as heterophasic propylene copolymers, propylene block-copolymers. Mixtures of more than one polypropylene are also possible.

The polypropylene composition may further contain additives and/or stabilisers like anti-oxidants, UV stabilisers, flame retardants, pigments, dyes, adhesion promoters like modified polypropylene, in particular maleated polypropylene, antistatic agents, mold release agents, nucleating agents and the like.

The polypropylene composition typically has a melt flow rate (MFR) that is significantly lower as compared to polypropylene compositions used in pultrusion processes. As such the MFR of the polypropylene composition may be from 10-100 g/10 min, preferably from 30-80 g/10 min as measured in accordance with ISO 1133 (2.16 kg, 230° C.). It is preferred to use a polypropylene in the polypropylene composition having a relatively low MFR, since those materials will intrinsically have improved mechanical properties over high MFR polypropylene materials.

In view of emission properties, i.e. the presence of low molecular weight materials that may be released upon exposure to high temperatures, such as incident sunlight, it is preferred that the polypropylene is a non-rheology controlled or non-visbroken polypropylene.

In a particular embodiment the material of the sheath may contain further reinforcing additives like inorganic reinforcing agents such as talc, short glass fibres and glass, or organic reinforcing agents such as aramid fibres, polyester fibres, and carbon fibres. Typically sheath materials may contain up to about 30 wt. % based on the weight of sheath material of such reinforcing additive.

For the avoidance of doubt it should be understood that the term "sheath" is to be considered as a layer that tightly accommodates the core.

The long glass fibre reinforced polypropylene composition in the method according to the present invention typically has from 10 to 70 wt. % of glass fibres, based on the total weight of the composition.

The glass fibres used in the present invention typically have a diameter in the range of from 5 to 50 micrometer, preferably from 10 to 30 micrometer such as from 15 to 25 micrometer. A thinner glass fibre generally leads to higher aspect ratio (length over diameter ratio) of the glass fibres in the final product prepared from the glass fibre reinforced composition, yet thinner glass fibres may be more difficult to manufacture and/or handle. In the method according to the present invention it is preferred that the glass fibres originate from glass multifibre strands, also referred to as glass rovings.

Preferably, the glass multifibre strand(s) or rovings contain from 500 to 10000 glass filaments per strand, more preferably from 2000 to 5000 glass filaments per strand. The linear density of the multifibre strand preferably is from 1000 to 5000 tex, corresponding to 1000 to 5000 grams per 1000 meter. Usually the glass fibres are circular in cross section meaning the thickness as defined above would mean diameter.

Rovings are generally available and well known to the skilled person. Examples of suitable rovings are the Advantex products designated for example as SE4220, SE4230 or SE4535 and available from 3B Fibre Glass company, available as 1200 or 2400 tex, or TUFRov 4575, TUFRov 4588 available from PPG Fibre Glass.

The composition as manufactured with the process according to the present invention is preferably in the form of pellets. The pellets preferably have a length of from 5 to 40 mm such as from 8 to 20 and preferably from 10 to 18 mm. The skilled person will understand that pellets preferably are substantially cylindrical with a circular cross section, yet other cross sectional shapes, like for example oval, triangular or (rounded) square also fall within the scope of the present invention.

In the pellets, the glass fibres generally extend in the longitudinal direction as a result of which they lie substantially in parallel to one another. The glass fibres extending in a longitudinal direction have a length of between 95% and 105%, more in particular between 99% and 101% of the length of a pellet. Ideally the length of the fibres is substantially the same as the length of the pellet, yet due to some misalignment, twisting, or process inaccuracies the length may vary within the aforementioned range.

Process

The process according to the invention is typically known as a wire-coating process. Wire-coating is done by passing the continuous glass multifibre strand (roving) through a wire-coating die. Said die is attached to an extruder which supplies molten polypropylene composition through an opening substantially perpendicular to the direction of the glass multifibre strand through the die. As such the thermoplastic polymer basically sheaths or encapsulates the glass multifibre strand which is the "wire" to be "coated". Such a process is also disclosed in WO 99/00543, the essential difference being that WO 99/00543 does not require the application of impregnating agent prior to the sheathing with the thermoplastic polyolefin.

The skilled person will understand that the core of the pellet comprising the glass fibres and the impregnating agent will only be surrounded by the polyolefin sheath in the longitudinal direction. Hence, the core of the pellet is exposed to the surrounding at the two cutting planes, or cross sectional surfaces corresponding to the positions where the pellet was cut. It is for this reason that upon insufficient coupling of the glass fibres to the polyolefin sheath the glass fibres may separate from the pellet resulting in free glass as explained above.

In the process according to the invention, preferably step b) is performed at an impregnating position and step c) is performed at a sheathing position, such that the impregnating position is spaced apart from the sheathing position by at most 100 cm, preferably at most 50 cm, more preferably at most 25 cm. Preferably the distance between the impregnating position and the sheathing position is as small as possible and may even be less than 10 cm. Without willing to be strictly bound to it, the present inventors believe that is beneficial to apply the polypropylene sheath relatively quickly after the application of the impregnating agent, as this will keep the impregnating agent at a relatively high temperature for a longer time, which in turn allows an improved impregnation of the glass multifibre strand. If the distance between the impregnating position and sheathing position would be too long then the impregnating agent, after being applied, may rapidly increase in viscosity ore even solidify before application of the sheath, such supposedly resulting in a worse impregnation of the glass multifibre strand.

The glass fibre reinforced polypropylene composition manufactured with the process according to the invention may be used for the manufacture of articles or structural parts by known down-stream processing techniques. Such techniques include injection moulding, extrusion moulding, compression moulding and the like.

Typical applications of the composition of the present invention are structural parts requiring a high stiffness.

For example the composition of the present invention can be used for the manufacture of automotive parts, like bumpers, instrument panel carriers, door modules, tailgates, front-end modules, gas pedal boxes, airbag housing, air conduits, sun-roof structures, batter-boxes and the like.

Alternatively the composition of the present invention can be used for the manufacture of rods, sheets, pipes or pipes forming the basic building blocks for any structural application either as automotive or non-automotive.

In addition the composition of the present invention may be used for the manufacture of domestic appliances like washing machines, wash dryers, electrical appliances like coffeemakers, toasters, refrigerators, vacuum cleaners and the like.

EXAMPLE

A glass fibre reinforced polypropylene composition is manufactured with a wire coating process as generally disclosed in WO 2009/080281.

The polyolefin sheath material is SABIC PP579S polypropylene, available from SABIC and having a melt flow as determined according to ISO 1133 (2.16 kg, 230° C.) of 47 g/10 min.

The glass multifibre strand (roving) is SE4230 available from 3B Fibre Glass Company. The glass fibres in the multifibre strand have a diameter of about 19 micrometer and having a density of about 3000 tex, which can be calculated to correspond to approximately 4000 fibres per multifibre strand.

The long glass fibre reinforced polypropylene composition contains 60 wt. % of glass fibre, based on the weight of the composition.

The amount of impregnating agent is 9.2 wt. % based on the weight of the glass multifibre strand. This corresponds to about 5.5 wt. % based on a composition containing 60 wt % of glass.

The impregnating agent consists of a microcrystalline wax available at IGI under the name Microsere 5897A. No materials or additives are added and the material is used "as received".

The process is started at a relatively low line speed and then gradually increased. Using the microcrystalline mentioned above as impregnating agent line speeds can be obtained of 6.7, 7.2, 7.7 and even 8.3 m/s. Above 10 m/s it becomes more difficult to sufficiently cool the sheathed multifibre strand prior to the same being cut into pellets with the current manufacturing configuration. Yet, the present inventors believe that even at speeds up to 10 m/s the impregnation of the glass fibres will be sufficient so as to prevent high amounts of free glass and acceptable levels of white spots during downstream injection moulding processes.

The invention claimed is:

1. A process for the manufacture of a long glass fibre reinforced polypropylene composition at a line speed of at least 6.7 m/s comprising the steps of:
   a. providing at least one continuous glass multifibre strand,
   b. applying from 0.5 to 20 wt. % based on the weight of the long glass fibre reinforced polypropylene composition of an impregnating agent to said at least one continuous glass multifibre strand,
   c. applying a sheath of a polypropylene composition around the at least one continuous glass multifibre strand obtained in step b) so as to form a sheathed continuous multifibre strand,
   wherein the impregnating agent contains at least 90 wt. % of microcrystalline wax based on the weight of the impregnating agent.

2. The process of claim 1, wherein the microcrystalline wax has one or more of the following properties, a drop melting point of from 60 to 90° C. as determined in accordance with ASTM D127 a congealing point of from 55 to 90° C. as determined in accordance with ASTMD938 a needle pen penetration at 25° C. of from 7 to 40 tenths of a mm as determined in accordance with ASTM D1321 a viscosity at 100° C. of from 10 to 25 mPa·s as determined in accordance with ASTM D445 an oil content of from 0 to 5 wt. % based on the weight of the microcrystalline wax as determined in accordance with ASTM D721.

3. The process of claim 2, wherein the microcrystalline wax has the following properties a drop melting point of from 60 to 90° C. as determined in accordance with ASTM D127, and a congealing point of from 55 to 90° C. as determined in accordance with ASTMD938, and a needle pen penetration at 25° C. of from 7 to 40 tenths of a mm as determined in accordance with ASTM D1321, and a viscosity at 100° C. of from 10 to 25 mPa·s as determined in accordance with ASTM D445, and an oil content of from 0 to 5 wt. % based on the weight of the microcrystalline wax as determined in accordance with ASTM D721.

4. The process of claim 1, wherein the impregnating agent comprises at least 95 wt. %, more preferably at least 99 wt. % of microcrystalline wax.

5. The process of claim 1, wherein the impregnating agent consists of microcrystalline wax.

6. The process of claim 1, wherein the line speed is from 6.7-10 m/s.

7. The process of claim 1, wherein the polypropylene composition has a melt flow rate of from 10-100 g/10 min as measured in accordance with ISO 1133 (2.16 kg, 230° C.).

8. The process of claim 1, wherein a glass amount in the long glass fibre reinforced polypropylene composition is from 10-70 wt. % on the basis of the long glass fibre reinforced polypropylene composition.

9. The process of claim 1, wherein step b) is performed at an impregnating position and step c) is performed at a sheathing position and wherein the impregnating position is spaced apart from the sheathing position by at most 100 cm.

10. The process of claim 1, further comprising a step of cooling the sheathed continuous multifibre strand and cutting the same into pellets, having a length of from 5 to 40 mm.

11. The process of claim 10, wherein in the pellets the glass fibres extend in a longitudinal direction of the pellet and have a length of between 95% and 105% of the length of a pellet.

12. The process of claim 4, wherein the impregnating agent comprises at least 99 wt. % of microcrystalline wax.

13. The process of claim 7, wherein the melt flow rate is 30-80 g/10 minutes as measured in accordance with ISO 1133 (2.16 kg, 230° C.).

14. The process of claim 9, wherein the impregnating position is spaced apart from the sheathing position by at most 50 cm.

15. The process of claim 14, wherein the impregnating position is spaced apart from the sheathing position by at most 25 cm.

16. The process of claim 10, wherein the pellets have a length of from 8 to 20 mm.

17. The process of claim 16, wherein the pellets have a length of from 10 to 18 mm.

* * * * *